(12) United States Patent
DeMartino et al.

(10) Patent No.: US 6,483,979 B1
(45) Date of Patent: Nov. 19, 2002

(54) NON-ADHESIVE MECHANICAL FIBER CONNECTION

(75) Inventors: Steven E. DeMartino, Elmira, NY (US); Peter Knowles, Horseheads, NY (US); James E. Webb, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/494,413

(22) Filed: Jan. 31, 2000

(51) Int. Cl.⁷ .................................................. G02B 6/00
(52) U.S. Cl. ......................................... 385/137; 385/37
(58) Field of Search ............................. 385/37, 55, 56, 385/60, 62, 63, 76, 81, 84, 87, 137, 138, 139

(56) References Cited

U.S. PATENT DOCUMENTS

| | | | |
|---|---|---|---|
| 4,252,407 A | * 2/1981 | Bubanko et al. | 385/59 |
| 4,784,456 A | * 11/1988 | Smith | 385/55 |
| 5,134,673 A | * 7/1992 | Stephenson et al. | 385/56 |
| 5,404,417 A | 4/1995 | Johnson et al. | |
| 5,598,500 A | * 1/1997 | Crespel et al. | 385/139 |
| 5,694,503 A | * 12/1997 | Fleming et al. | 385/37 |
| 5,771,324 A | * 6/1998 | Hargis | 385/43 |
| 5,963,699 A | * 10/1999 | Tanaka et al. | 385/97 |
| 5,991,483 A | * 11/1999 | Engelberth | 385/37 |
| 5,993,070 A | * 11/1999 | Tamekuni et al. | 385/65 |
| 6,175,674 B1 | * 1/2001 | Lin | 385/37 |

FOREIGN PATENT DOCUMENTS

| | | |
|---|---|---|
| DE | 19724528 A1 | * 12/1998 |
| JP | 11-14917 | * 1/1999 |
| JP | 206345 A | * 7/2000 |
| JP | 206347 A | * 7/2000 |

* cited by examiner

Primary Examiner—Rodney Bovernick
Assistant Examiner—Juliana K. Kang
(74) Attorney, Agent, or Firm—Svetlana Z. Short

(57) ABSTRACT

An apparatus is provided for mechanically attaching an optical fiber to a substrate. The apparatus includes a clamping block formed of malleable material disposed adjacent a substrate. The fiber is disposed adjacent the clamping block and a securing member such as a fastener or spring is used to secure the fiber to the clamping block and substrate. The frictional forces between the fiber and the clamping block eliminate movement of the fiber relative to the substrate.

17 Claims, 4 Drawing Sheets

NON-ADHESIVE MECHANICAL FIBER CONNECTION

BACKGROUND OF THE INVENTION

1. Technical Field

The present invention generally relates to alignment, positioning, attachment and connection of optical fibers to other components and more specifically to devices incorporating fiber bragg gratings.

2. Discussion

A fiber bragg grating device consists of an optical fiber having a periodic stack of regions with higher and lower refractive indexes. With this configuration, light within a narrow band of wavelengths is reflected while all wavelengths outside that band are transmitted. One critical aspect of fiber bragg grating devices is the period at which the higher and lower refractive index regions change with temperature.

Conventional bragg grating devices compensate for thermal drift and refractive index changes by mounting the fiber under tension on a negative thermal expansion substrate. The fiber is mounted to the substrate by way of a glass frit. Glass frits are advantageous since they exhibit little or no creep. However, glass frits also have certain drawbacks.

For example, a significant problem associated with glass frits results from the high temperatures required for attachment. That is, cooling of the frit results in large stresses on the assembly due to the thermal expansion mismatch between the frit, fiber, and substrate. Additionally, high temperatures have been shown to degrade certain types of negative expansion substrates, cause CWL drift, grating fade, and decrease fiber tensile strength.

One theory for overcoming the above-identified problems is to attach the fiber to the substrate at a temperature near the operating temperature of the assembly such that the effect of the thermal expansion mismatch is minimized. Adhesive polymers have been considered for such use. However, polymers exhibit significant creep which is detrimental to the performance of the fiber bragg grating device.

In view of the foregoing, it would be desirable to provide an apparatus for attaching a fiber to a substrate such as those used in fiber bragg grating devices which overcomes the problems associated with the prior art.

SUMMARY OF THE INVENTION

The above and other objects are provided by mechanically attaching the fiber to the substrate such that no chemical bond is made with the fiber and only frictional forces from an applied radial force hold the fiber in place. The mechanical attachment is made at ambient temperatures such that the thermal expansion mismatch of the materials used is not a concern. The apparatus preferably includes a clamping block formed of malleable material disposed adjacent substrate. An optical fiber is disposed adjacent the clamping block and a securing member such as a fastener or spring is used to secure the fiber to the clamping block substrate. The frictional forces between the fiber and the clamping block eliminate movement of the fiber relative to the substrate.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards an apparatus which minimizes thermal problems associated with the attachment of a fiber to a substrate. The present invention employs a mechanical device for attaching the fiber to the substrate such that no chemical bond is made with the fiber and only frictional forces resulting from applied radial forces hold the fiber in place. The mechanical attachment is made at ambient temperatures such that thermal expansion mismatch is eliminated.

Figure 1:
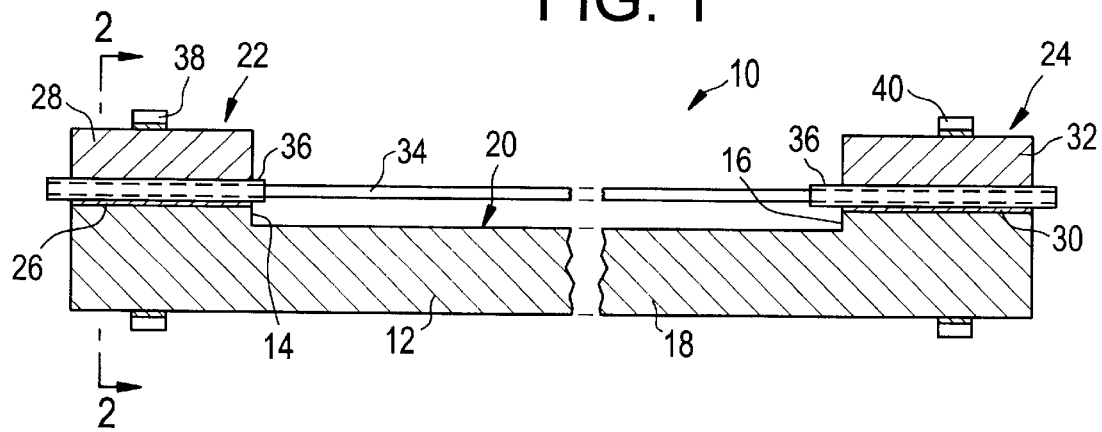
FIG. 1 is a side view of the fiber bragg grating apparatus of the present invention.
Figure 2:
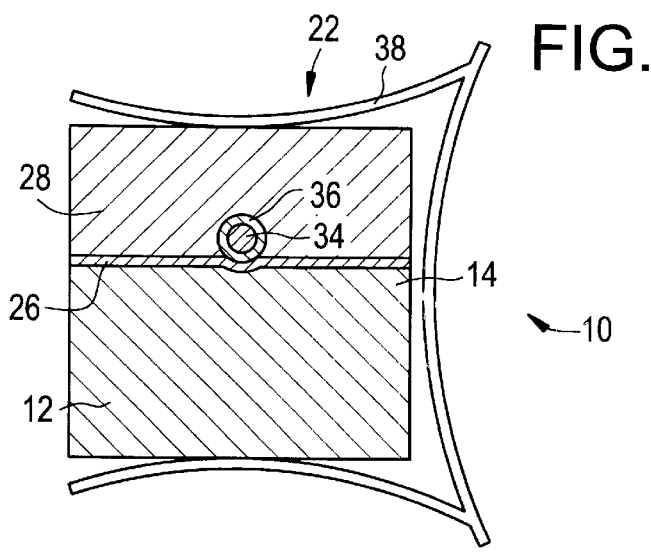
FIG. 2 is an end view of the fiber bragg grating apparatus illustrated in FIG. 1.

Referring now to the drawing figures, FIGS. 1 and 2 illustrates an apparatus in accordance with the teachings of the present invention generally at 10. Although the illustrated apparatus 10 is a fiber bragg grating, are still in the art will appreciate that other fiber/substrate assemblies could substitute therefore. The apparatus 10 includes a substrate 12 which is generally rectangularly shaped. More particularly, the substrate 12 is a negative expansion substrate which is particularly well suited for use in a fiber bragg grating device. The substrate 12 is preferably formed of ceramic or other materials having high moduli and hardness values which only require a small contact area for frictional loading. As such, these materials require only a small contact area proximate the fiber (described below) which is the most likely area for fiber damage.

The substrate 12 includes a first end 14 axially spaced apart from a second end 16. The first and second ends 14 and 16 are generally cubical and project away from a rectangular body 18 of the substrate 12. The area between the first and second ends 14 and 16 and adjacent the body 18 defines a recess 20.

A first cubical clamping block 22 is disposed adjacent the first end 14 of the substrate 12. A second cubical clamping block 24 is disposed adjacent the second end 16 of the substrate 12. The first clamping block 22 includes a relatively thin lower member 26 abutting the first end 14 of the substrate 12 and an upper member 28 disposed opposite the lower member 26. Similarly, the second clamping block 24 includes a relatively thin lower member 30 abutting the second end 16 of the substrate 12 and an upper member 32 disposed opposite the lower member 30. The first and second clamping blocks 22 and 24 are preferably formed of a malleable material having high toughness, low hardness, and a high coefficient of friction with glass. Aluminum such as stress relieved aluminum 1100-0 is preferred for this purpose, but other materials including copper, steel and polymers such as polycarbonite may substitute therefore.

An optical fiber 34 is secured to the first clamping block 22 and the second clamping block 24 such that it spans the recess 20 under tension. Preferably, the fiber 34 is interposed between the lower member 26 and upper member 28 of the first clamping block 22 and between the lower member 30 and upper member 32 of the second clamping block 24 such that frictional forces hold it in place. An optional sheath 36 is disposed about the fiber 34 between the members of the first and second clamping blocks 22 and 24. The sheath 36 provides some protective cushioning of the fiber 34 while in the first and second clamping blocks 22 and 24.

A securing mechanism in the form of a biasing member or spring 38 secures the first clamping block 22 around the fiber 34 and to the substrate 12. A second securing mechanism in the form of a biasing member or spring 40 secures the second clamping block 24 about the fiber 34 and to the substrate 12. The first and second springs 38 and 40 are preferably C-shaped members which provide a compressive force sufficient enough to prevent lateral movement of the fiber 34 relative to the substrate 12.

Because of the malleable nature of the material used for the first and second clamping blocks 22 and 24, the load from the springs 38 and 40 causes deformation of the material around the fiber 34. This produces a large area of frictional contact around the fiber 34. If desired, the frictional forces at the interface of the fiber 34 and first and second clamping blocks 22 and 24 may be altered by removing the sheath 36 from the fiber 34.

Figure 3:
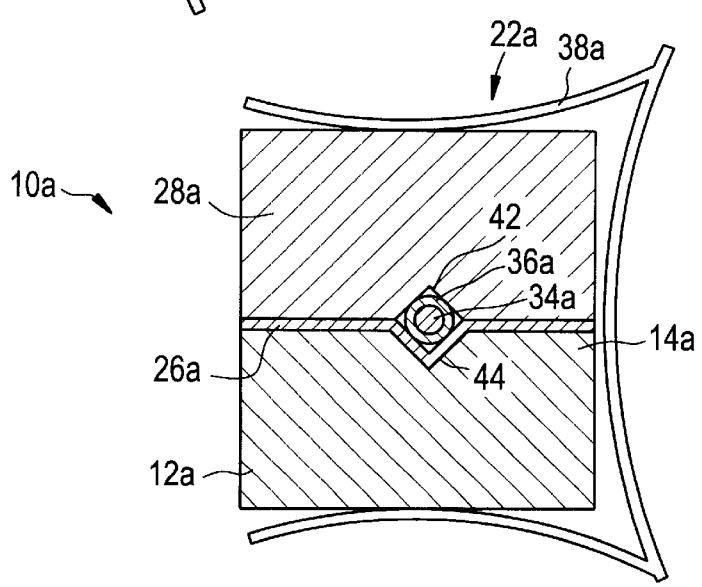
FIG. 3 is an end view of an alternate embodiment fiber bragg grating apparatus of the present invention.

Referring now to FIG. 3, an alternate embodiment fiber bragg grating apparatus 10a is illustrated. This embodiment is essentially identical to the first embodiment and therefore a description of the identical parts is omitted herein. In this embodiment, the upper member 28a of the first clamping block 22a includes a groove 42 formed therein. Similarly, the first end 14a of the substrate 12a includes a groove 44 formed therein opposite the groove 42. The lower member 26a of the first clamping block 22a is shaped to complement the groove 44. Alternatively, if the lower member 26a is thick enough, the groove 44 may be formed in the lower member 26a instead of in the substrate 12a. The grooves 42 and 44 may be used to tailor the mechanical attachment between the fiber 34 and the substrate 12. Although not illustrated, one skilled in the art will appreciate that the second clamping block 24 and second end 16 of the substrate 12 illustrated in FIG. 1 may be formed as illustrated in FIG. 3.

Figure 4:
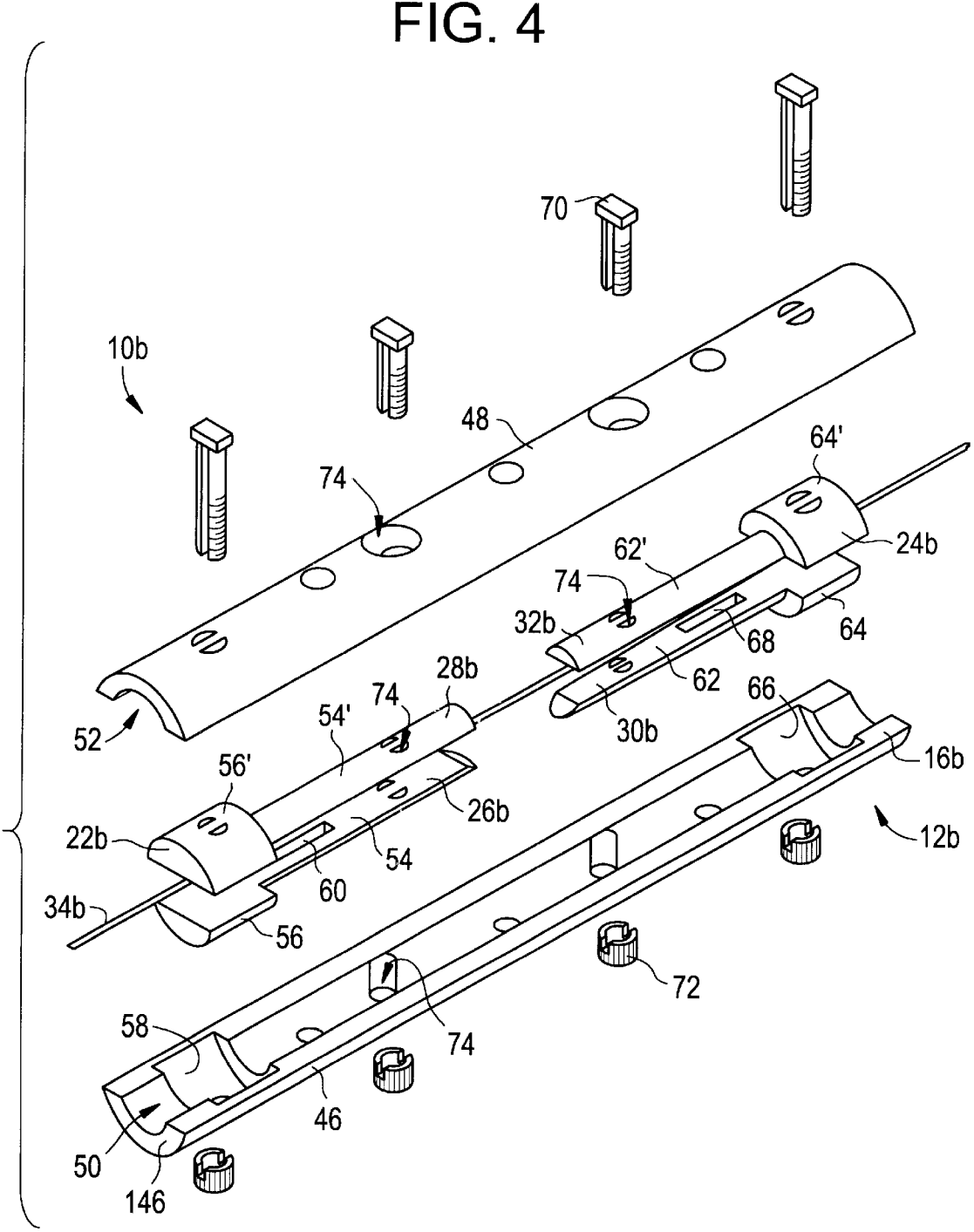
FIG. 4 is an exploded perspective view of an alternate embodiment fiber bragg grating apparatus of the present invention.

Turning now to FIG. 4, another alternate embodiment fiber bragg grating apparatus 10b is illustrated. In this embodiment, like reference numerals are employed to identify like elements. The apparatus 10b includes a substrate 12b in the form of a first casing member 46 and an oppositely disposed second casing member 48. The first casing member 46 includes an axial channel 50 formed therein between the first end 14b and second end 16b. Likewise, the second casing member 48 includes an axial channel 52 formed therein. The first and second casing members 46 and 48 are preferably shaped as half-cylinders which are suitable for coupling to one another.

A first clamping block 22b formed of malleable material is nested within the axial channel 50 of the first casing member 26 and the axial channel 52 of the second casing member 48. The first clamping block 22b includes a lower member 26b adjacent the first casing member 46 and an upper member 28b adjacent the second casing member 48. The lower and upper members 26 and 28 preferably include a first half-cylinder portion 54 and a second half-cylinder portion 56 extending from the first half-cylinder portion 54. The second half-cylinder portion 56 has a diameter which is greater than the diameter of the first half-cylinder portion 54. The axial channel 50 of the first casing member 46 preferably includes a recess 58 for receiving the second half-cylinder portion 56 and preventing its movement relative to the first casing member 46. A recess 60 is formed in the first half-cylinder portion 54 and, although not illustrated, a complementary recess is formed in the second half-cylinder portion 56.

A second clamping block 24b formed of malleable material is also nested within the axial channel 50 of the first casing member 46 and the axial channel 52 of the second casing member 48. The second clamping block 24b includes a lower member 30b and an upper member 32b. The lower and upper members 30b and 32b of the second clamping block 24b preferably include a first half-cylinder portion 62 and a second half-cylinder portion 64 extending from an end of the first half-cylinder portion 62. The second half-cylinder portion 64 preferably has a diameter which is greater than a diameter of the first half-cylinder portion 62. A second recess 66 is preferably formed in the first casing member 46 for receiving the second half-cylinder portion 64 and preventing movement of the second clamping block 24 relative to the first casing member 46. A recess 68 is preferably formed in the first half-cylinder portion 62 of the lower member 30 of the second clamping block 24 and, although not illustrated, a complementary recess is preferably formed in the upper member 32.

A securing mechanism in the form of a plurality of bi-podal clamping studs 70 and locking rings 72 are provided for interengaging the first and second casing members 46 and 48 while straddling the fiber 34b and securing the first and second clamping blocks 22b and 24b around the fiber 34b. It is preferred that the fiber 34b be a coated fiber to resist abrasion during the clamping process. The abrasion may result in breakage of the fiber and the coating prevents the fiber from breaking. A plurality of apertures 74 are provided in the first and second casing members 46 and 48 and first and second clamping blocks 22b and 24b for accommodating the studs 70.

Figure 5:
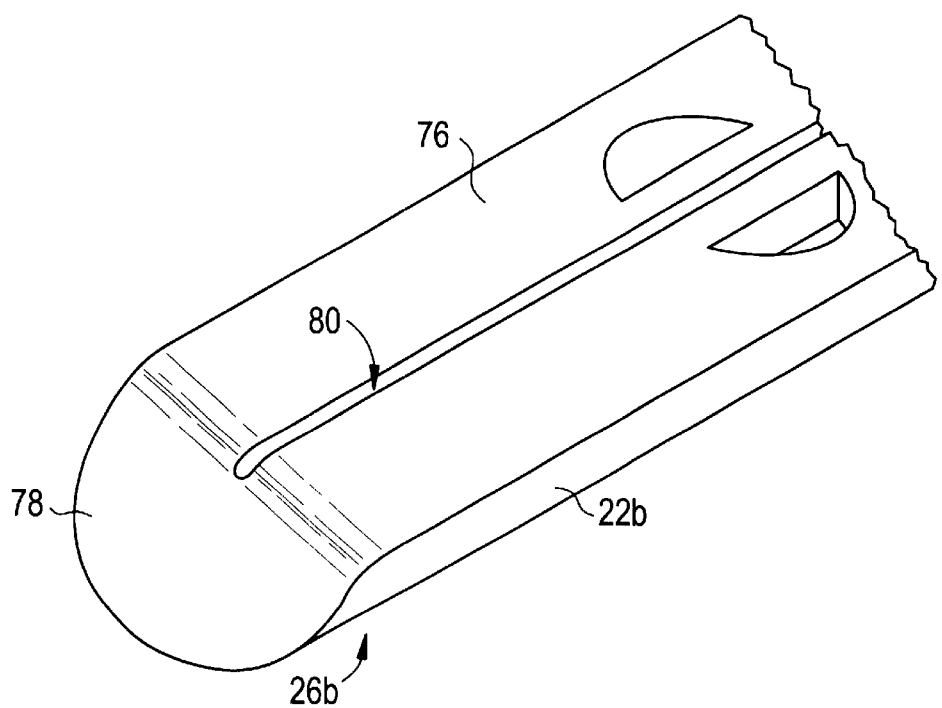
FIG. 5 is a more detailed view of a portion of the fiber bragg grating apparatus illustrated in FIG. 4.

Turning now to FIG. 5, a detailed view of an end of the lower member 26b of the first clamping block 22b is illustrated. The fiber mounting face 76 is planar and the edge 78 is rounded at the fiber exit point so not to induce any stress concentrations into the fiber. The groove 80 is formed by the material of the fiber mounting face deforming around the fiber during compression.

Figure 6:
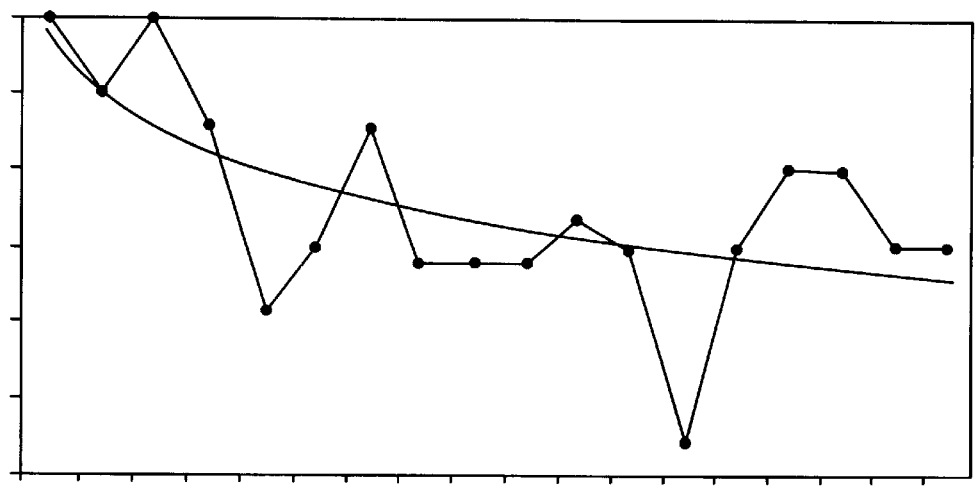
FIG. 6 is a graphical illustration depicting the amount of creep associated with the apparatus of the present invention.

Referring now to FIG. 6, a fiber bragg grating device incorporating the teachings of the present invention was fabricated to determine the amount of creep. The fiber was held under tension (5 Kpsi) between two pieces of stress-relieved aluminum 1100-0. The wavelength-stress coupling coefficient of the fiber was approximately 0.10 nanometers per 1 Kpsi tensile stress. The total tensile stress of the fiber was approximately 35 Kpsi before any relaxation. On average, the creep associated with the present invention is approximately 0.3 micron length change or approximately a loss of 650 psi tensile stress out of a total tensile stress of 34 Kpsi. By reducing the total tensile stress of this system, the creep associated with the clamping block also decreases.

Figure 7:
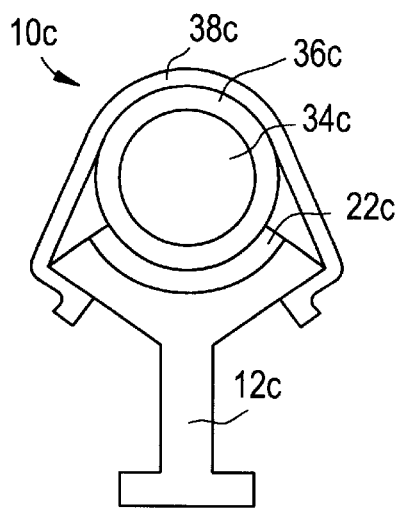
FIG. 7 is an end view of an alternate embodiment of the present invention.

Turning now to FIG. 7, another alternate embodiment of the present invention is illustrated. The apparatus 10c includes a substrate 12c in the form of a pedestal. A first clamping block 22c formed of malleable material is disposed adjacent the substrate 12c. The fiber 34c is disposed adjacent the first clamping block 22c. An optional sheath 36c encompasses the fiber 34c. A securing mechanism in the form of a spring 38c secures the fiber 34c to the first clamping block 22c. The frictional forces between the fiber 34c and the ductile yield of the first clamping block 22c, as provided by the load from the spring 38c maintain the position of the fiber 34c relative to the substrate 12c.

Figure 8:
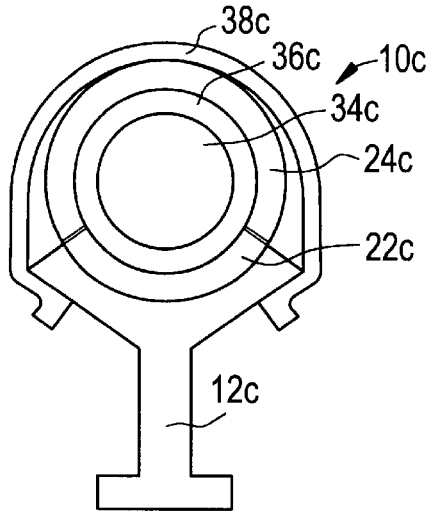
FIG. 8 is an end view of another alternate embodiment of the present invention.

Turning now to FIG. 8, a variation of the embodiment illustrated in FIG. 7 is shown. In this illustration, like reference numerals are used to identify like components. In this embodiment, a second clamping block 24c is disposed opposite the first clamping block 22c so as to sandwich the fiber 34c therebetween. The use of the second clamping block 24c provides additional contact along the fiber 34c for generating frictional forces.

Figure 9:
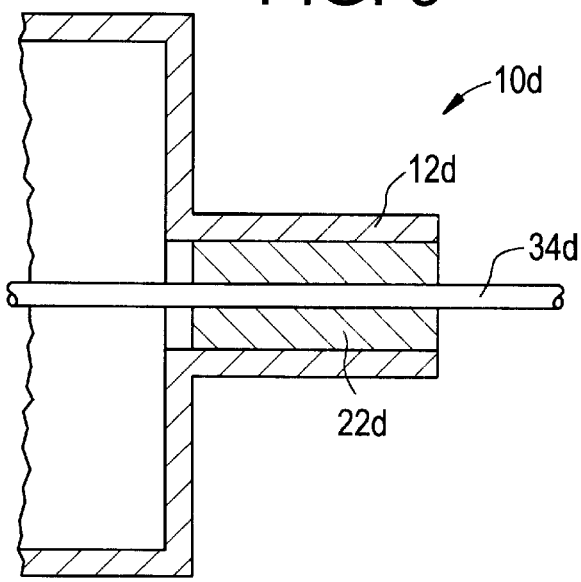
FIG. 9 is a cross-sectional view of yet another embodiment of the present invention.
Figure 10:
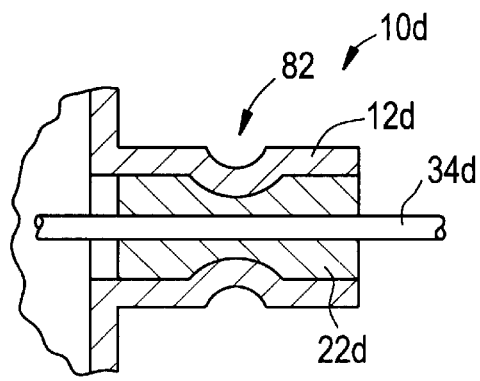
FIG. 10 is a cross-sectional view of yet another embodiment of the present invention.

Turning now to FIG. 9, yet another embodiment of the present invention is illustrated. The apparatus 10d includes a substrate 12d in the form of a port of an assembly package. A first clamping block 22d is disposed within the port 12d. The first clamping block 22d is preferably shaped as a cylinder having an axial boar formed therethrough. Alternatively, the first clamping block 22d may be formed of two or more separate components. The fiber 34d is passed through the first clamping block 22d and port 12d. The first clamping block 22d may be fastened to the port 12d or may be secured in place by frictional interference. The frictional forces for securing the fiber 34d relative to the first clamping block 22d may be generated by a thermal expansion mismatch between the material of the first clamping block 22d and port 12d, a forced fit of the first clamping block 22d into the port 12d, or by forming a crimp 82 in the port 12d adjacent the first crimping block 22d as illustrated in FIG. 10.

Thus, a device for providing mechanical attachment between a fiber and a substrate is provided. The mechanical attachment is made at ambient temperatures such that no concerns for thermal expansion mismatch exist. Nonetheless, the frictional forces of the attachment essentially eliminate movement of the fiber relative to the substrate. The present invention improves reliability and decreases costs of positioning and/or attaching a fiber to a substrate.

Those skilled in the art can now appreciate from the foregoing description that the broad teachings of the present invention can be implemented in a variety of forms. For example, those skilled in the art that will appreciate that other types of optical fibers may also be aligned, positioned, attached, and connected by utilizing the above described method and device. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus comprising:
    a substrate;
    a first clamping block secured to said substrate; and
    an optical fiber frictionally secured to said clamping block so as to be fixed relative to said substrate, said apparatus further comprising a sheath, said sheath being (i) directly adjacent to said fiber, (ii) surrounding said fiber and (iii) interposed between said fiber and said clamping block, further comprising another clamping block secured to said substrate and frictionally secured to said fiber.

2. An apparatus according to claim 1, wherein said first clamping block further comprises:
    a first clamping member abutting said substrate;
    a second clamping member disposed opposite said first clamping member and sandwiching said optical fiber there between; and
    a securing member interengaging said first clamping member and said second clamping member so as to frictionally secure said optical fiber there between.

3. The apparatus of claim 2 wherein said securing member further comprises a biasing member urging said first clamping member toward said second clamping member.

4. The apparatus of claim 1, wherein said first clamping block includes an axial groove formed therein for receiving said optical fiber.

5. The apparatus of claim 1, wherein said substrate includes an axial groove formed therein for receiving said optical fiber.

6. The apparatus of claim 1, wherein said substrate further comprises one of the group consisting of a bridge, turn work, pump laser, and port.

7. The apparatus of claim 1, wherein said substrate further comprises a negative thermal expansion substrate.

8. An apparatus comprising:
    a substrate;
    a first clamping block secured to said substrate; and
    an optical fiber frictionally secured to said clamping block so as to be fixed relative to said substrate, said apparatus further comprising a sheath, said sheath being (i) directly adjacent to said fiber, (ii) surrounding said fiber and (iii) interposed between said fiber and said clamping block, wherein said substrate further comprises:
    a first casing member;
    a second casing member disposed opposite said first casing member; and
    at least one fastener interengaging said first and second casing members so as to secure said clamping block therebetween.

9. The apparatus of claim 8 wherein said clamping block is formed of a malleable material.

10. The apparatus of claim 9 wherein said malleable material further comprises aluminum.

11. A device comprising:
    a first casing member having a first axially aligned channel formed therein;
    a first clamping block disposed in said first channel of said first casing member;
    a second clamping block disposed in said first channel of said first casing member axially spaced apart from said first clamping block;
    an optical fiber frictionally secured to said first and second clamping blocks;
    a second casing member having a second axially aligned channel formed therein disposed over said first and second clamping blocks and opposite said first casing member so as to secure said first and second clamping blocks between said first and second casing members; and at least one securing member interengaging said first and second casing members.

12. The device of claim 11 wherein said first casing member further comprises an elongated half-cylinder shaped member.

13. The device of claim 11 wherein said second casing member further comprises an elongated half-cylinder shaped member.

14. The device of claim 11 wherein said first clamping block further comprises:

a first clamping member abutting said first casing member; and a second clamping member disposed opposite said first clamping member and frictionally securing said optical fiber therebetween.

15. The device of claim 14 wherein said first and second clamping members further comprise:

a first half-cylinder portion including a recess formed therein; and a second half-cylinder portion extending from an end of said first half-cylinder portion, said second half-cylinder portion having a greater diameter than said first half-cylinder portion.

16. The device of claim 11 wherein said second clamping block further comprises:

a first clamping member abutting said first casing member; and a second clamping member disposed opposite said first clamping member and frictionally securing said optical fiber therebetween.

17. The device of claim 16 wherein said first and second clamping members further comprise:

a first half-cylinder portion including a recess formed therein; and a second half-cylinder portion extending from an end of said first half-cylinder portion, said second half-cylinder portion having a greater diameter than said first half-cylinder portion.

* * * * *